May 11, 1943.  E. B. ANDERSON  2,319,100
CONSTANT VELOCITY JOINT
Filed Sept. 21, 1940
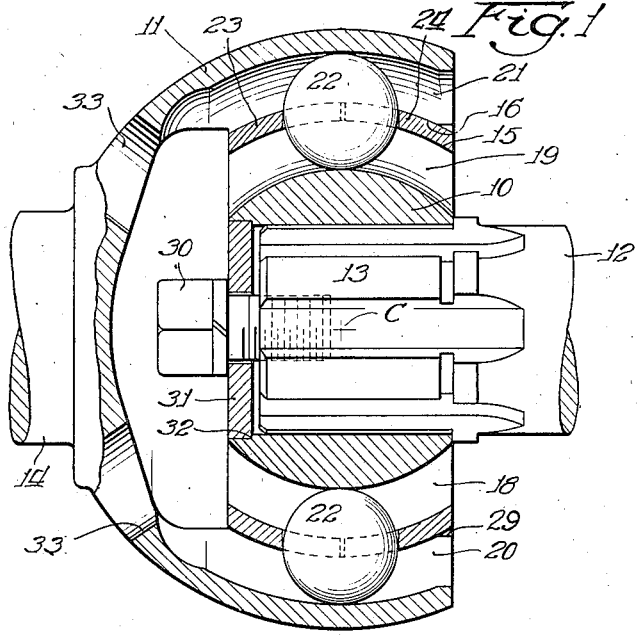
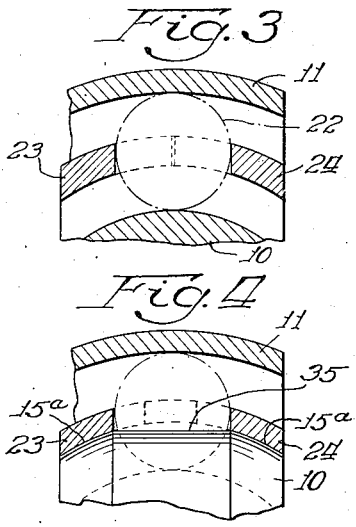
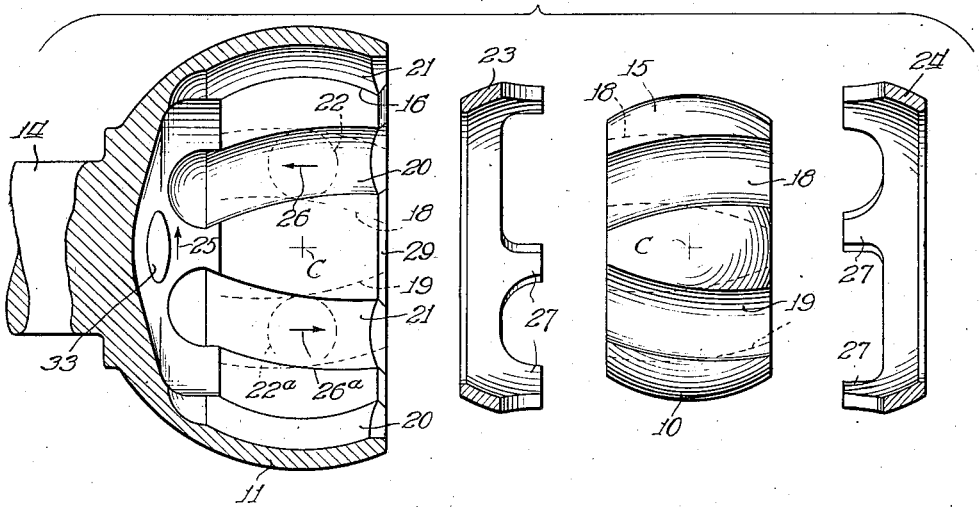
Inventor:
Edmund B. Anderson
By: Edward C. Fitzhaugh
Atty.

Patented May 11, 1943

2,319,100

UNITED STATES PATENT OFFICE 2,319,100

CONSTANT VELOCITY JOINT

Edmund B. Anderson, Rockford, Ill., assignor to Borg-Warner Corporation, Chicago, Ill., a corporation of Illinois Application September 21, 1940, Serial No. 357,739

3 Claims. (Cl. 64—21)

This invention relates to constant velocity universal joints of the type wherein torque is transmitted from one of the joint elements to the other through the medium of balls operating in raceways formed in the respective elements. The invention relates particularly to joints of this type wherein the raceways extend diagonally in a generally axial direction, with the raceways of each pair in crossed relationship to each other and with a torque-transmitting ball located at the crossing of each pair of raceways.

In a universal joint of this type, the torque reaction of the crossed raceways develops thrust against the balls in an axial direction. In my prior Patent No. 2,047,660, issued July 14, 1936, I have disclosed a joint of this type which is provided with a pair of thrust-reaction rings arranged in axial thrust-bearing engagement with the outer or female torque-transmitting element and embracing the balls between them so as to take the axial thrust of the balls and maintain the balls in properly centered relationship. In the joint shown in that patent, the thrust upon all of the balls is in the same direction, the direction depending upon the direction in which torque is transmitted from one element to the other.

The present invention has as its primary object to improve upon the construction shown in said prior patent, by arranging for the axial thrust upon the balls to be equally distributed in both directions.

Other objects, the advantages and uses of the invention will become more apparent after reading the following specification and claims, and after consideration of the drawings forming a part of the specification, wherein:

Fig. 1 is an axial sectional view of a universal joint embodying the invention;

Fig. 2 is an exploded axial sectional view of parts of the joint;

Fig. 3 is a partial sectional view of a modified form of the invention; and

Fig. 4 is a partial sectional view of another modified form of the invention.

As an example of one form in which my invention may be embodied, I have shown in the drawing a constant velocity universal joint comprising male and female torque-transmitting elements 10 and 11, respectively, each adapted to be attached to one of a pair of shaft sections to be drivingly connected by the joint. One of said shaft sections is shown at 12, having a splined end portion 13 on which the male element 10 is secured. The other shaft section is shown at 14 as being formed integrally with the female element 11.

The male element 10 has an outer surface 15 formed as a zone of a sphere and the female element 11 has an inner surface 16 formed as a zone of a sphere on a radius sufficiently larger than the radius of the surface 15 to accommodate between the two surfaces the thrust reaction rings which will be described more fully hereinafter.

Formed in the male element 10 are a plurality of external arcuate raceways 18 and 19 respectively. Formed in the female element 11 are a plurality of internal arcuate raceways 20 and 21 respectively. Each of the raceways 18, 19, 20 and 21 are disposed along great circles, i. e., on arcs struck from the centers of their respective elements from which centers the zonal surfaces 15 and 16 are likewise generated. In cross-section the raceways are preferably semi-circular.

The raceways 18 and 20 are associated together in pairs and the raceways 19 and 21 are likewise associated together in alternate pairs. Between the respective pairs of raceways are disposed balls 22 and 22a which are received in their respective raceways so as to transmit torque between the elements 10 and 11.

Each of the raceways is inclined with reference to a meridian or great circle passing through the axis of its respective element, the direction of meridional inclination of the raceways 18 being opposite to that of the raceways 20 and the direction of meridional inclination of the raceways 19 being likewise opposite to that of the raceways 21 whereby the raceways of each pair are arranged in crossed relationship. The balls 22 are located at the crossing of the raceways.

The transmission of torque between the elements 10 and 11 through the balls 22 results in axial thrust against the balls 22 owing to the wedging action of the crossed raceways against the balls. Such axial thrust is taken by a pair of zone-shaped thrust rings 23 and 24 which are shaped so as to fit rather snugly within the zonal surfaces 15 and 16 with just enough clearance to permit free sliding movement between the surfaces of the thrust rings and the surfaces 15 and 16 during operation of the joint.

Thrust exerted against the thrust rings 23 and 24 will be transmitted from the rings to the surface 16 of the female element 11.

The engagement between the rings 23, 24 and the surface 15 serves, in conjunction with the engagement between the thrust rings and the surface 16, to hold the elements 10 and 11 in assembled, concentric relationship.

The present invention provides for equalization of the axial torque reaction thrust developed against the balls by arranging the meridional inclination of the raceways of the series 18, 20 of alternate pairs of raceways opposite to the meridional inclination of the raceways of the series 19, 21. That is, the inclination of the raceway 20 is opposite to that of the raceway 21 and the inclination of the raceway 18 is opposite to that of the raceway 19. As a result, the balls 22 will be urged axially in one direction and the balls 22a will be urged axially in the other direction. For example, assuming the member 11 to be the driving member and to be rotating in the direction indicated by the arrow 25, the balls 22 will be urged in the direction indicated by the arrow 26 and the balls 22a will be urged in the direction indicated by the arrow 26a. Thus, in the particular form of the invention shown wherein six pairs of raceways and balls are employed, three of the balls will be urged axially in one direction and the other three will be urged axially in the other direction. Each series of three balls being equally distributed around the circumference of the joint, there will be a uniform axial pressure against each of the thrust rings 23, 24, tending to urge them apart. This results in a balancing of the axial forces reacting on the several parts of the joint and maintains the parts in accurately centered relationship at all times.

The arrangement of the raceways with alternate inclination provides the further advantage of utilizing the balls 22, 22a not only as torque-transmitting connections but also as means for resisting axially separating movement of the elements 10 and 11. In this respect the balls cooperate with the thrust rings 23 and 24 in maintaining the elements in centered relationship axially.

The rings 23, 24 may if desired, be provided with lug portions 27 extending between the balls 22, 23a and increasing the bearing surface of the ring against the surface 15, 16 respectively.

The mouth of the female element 11 is slightly larger than the maximum diameter of the male element 10 so as to permit the latter to be freely inserted therethrough. This may be accomplished in either of several different ways. The corner of the ridges defined between the raceways 20, 21 may be removed as indicated at 29 in Fig. 1. The difference between the diameters of the surfaces 15 and 16 may be made sufficiently large so that the diameter of the surface 15 is less than the diameter of the mouth of the female element. In thus increasing the spacing between the surfaces 15 and 16 the thickness of the thrust rings 23 and 24 would be correspondingly increased. This modification of the invention is shown in Fig. 3. A third arrangement whereby the maximum diameter of the male element may be made smaller than the mouth of the female element, is to form the intermediate region of the male element 10 with a cylindrical surface 35, thus reducing the diameter of such intermediate region without reducing the radius of the zonal surfaces 15a formed on either side of such intermediate surface 35. This form of the invention has the advantage that it does not materially decrease the effective thrust bearing surface of the male element 15, since most of the effective bearing surface in any form of the invention is confined to the side regions where the inclination of the bearing surface with reference to the axis of rotation of the joint is at a maximum. This modification of the invention is shown in Fig. 4. Such reduction of diameter of the male element may be combined with the removal of corners of the female element as at 29 in Fig. 1.

The above described arrangement wherein the maximum diameter of the male element is less than the minimum diameter of the mouth of the female element facilitates assembling of the joint, in that it makes it possible for the male element to assume whatever position will best facilitate the entry of the thrust rings 23 and 24 into the female element. For example, it is contemplated that the thrust rings 23 and 24 may be passed through the mouth of the female element by accommodating diametrically opposed regions of the rings 23 and 24 each in a pair of chordally opposed raceways 20 or 21. Using this method of assembly, the two thrust rings will be first assembled against the respective sides of the male element 10, the assembly positioned with its axis at right angles to the axis of the female element 11, with one of the thrust rings positioned in a plane passing through the outer extremities of two of the raceways 20, and with the other thrust ring positioned in a parallel plane passing through the outer extremities of two of the raceways 21. The assembly may then be passed through the mouth of the female element and rotated into a position wherein its axis is aligned with the axis of the female element. In order to permit this to be accomplished, the lugs 27 of the rings 23 and 24 may be terminated considerably short of the median or equatorial plane of surfaces 15, 16, as shown in Fig. 4. The restriction of the area of the lugs 27 does not reduce the effective thrust bearing surface as long as the total width of the thrust rings is not thereby made less than that of the zonal surfaces 15a.

After having assembled the thrust rings and male element with the female element, the balls are inserted by any suitable known method, such as for example as by oscillating the thrust ring and male element assembly to successive positions wherein the openings defined between pairs of registering notches between the projections 27, are exposed outside of the mouth of the female element 11 so as to permit the balls to be dropped through such openings and into the raceways 18 and 19.

The shaft 12 is then inserted in the bore of the male element 10 and the shaft and male element are cocked to a position wherein the axis of the shaft 12 is aligned with an opening 33 in the female element 11. Through the opening 33 a screw 30 is inserted through a washer 31 that has been previously seated against a shoulder 32 in one end of the bore of the male element 10, and is threaded by means of a tool inserted through said opening into the end of the shaft 12 until the shaft has been tightly secured in the element 10. In this respect, the invention provides an improved method of attaching the male element of a constant velocity universal joint to its shaft. While two of the openings 33 have been shown, only one is necessary for the assembling operation above described, the other opening being for balancing purposes.

I claim:

1. In a constant velocity universal joint, male and female torque transmitting elements cooperatively providing pairs of arcuate ball raceways each disposed on a great circle of its respective element and extending diagonally with reference to a meridian thereof, the raceways of each pair having opposite meridional inclination and being in crossed relation to each other, a ball disposed at the crossing of each pair of raceways and received in the respective raceways for forming a torque-transmitting connection between the elements, and a pair of opposed annular thrust receiving elements embracing said balls between them and disposed between the opposed surfaces of the elements and in thrust bearing engagement therewith, the meridional inclination of the raceways of alternate pairs being opposite to that of the raceways of the intervening pairs, whereby the axial thrust against the balls resulting from the torque reaction of the crossed grooves against the balls is directed alternately in opposite directions resulting in the constant maintenance of the external faces of both of said rings in snug engagement with the internal face of the female element.

2. A constant velocity universal joint comprising male and female torque-transmitting elements having opposed external and internal zone-shaped surfaces respectively, and cooperatively providing circumferentially spaced pairs of arcuate ball raceways, each disposed along a great circle of and inclined with reference to a meridian of its respective element, the meridional inclination of one raceway of a respective pair being opposite that of the other raceway whereby the raceways of each pair are disposed in cross-relationship, a ball located at the crossing of each pair and received in the respective raceways so as to provide a torque-transmitting connection between the elements, and a pair of zone-shaped rings interposed between and in bearing engagement with the aforesaid zone-shaped surfaces of the element, said rings embracing the balls between them and arranged to take the axial thrust developed in the balls by the torque reaction of the crossed raceways thereagainst, the meridional inclination of the raceways of alternate pairs being opposite to that of the raceways of the intervening pairs, whereby said torque-reactional thrust is applied to the balls alternately in opposite directions so as to cause alternate balls to bear against one of said rings and the intervening balls to bear against the other of said rings resulting in the constant maintenance of the external faces of both of said rings in snug engagement with the internal face of the female element.

3. A universal joint comprising a cup-shaped female element and a zone-shaped male element received therein, said elements having internal and external ball raceways respectively, spherical torque-transmitting elements disposed in said raceways, a shaft extending into said male element, and a securing element threaded into the inner end of said shaft, for securing the same in said male element, said female element having a hub region and, at one side of the hub region an opening extending diagonally towards the center of the joint, through which said securing element is adapted to be inserted into the end of said shaft in one position of the latter.

EDMUND B. ANDERSON.